United States Patent Office 3,107,256
Patented Oct. 15, 1963

3,107,256
16-TRIFLUOROACETYL DERIVATIVES OF
5-ANDROSTEN-3β-OL-17-ONE
Marcel Harnik, Morristown, Tenn., assignor to Chemetron Corporation, Chicago, Ill., a corporation of Delaware
No Drawing. Filed Sept. 20, 1961, Ser. No. 139,381
7 Claims. (Cl. 260—397.4)

This invention relates to androstenolone and androstanolone compounds of the following general formulae and to the production thereof:

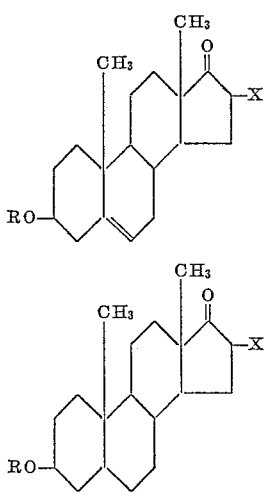

wherein X is a trifluoroacetyl, trifluuoroethyl, trifluoroacyloxyethylidene, trifluorohydroxyethyl, and trifluoroacyloxyethyl radical and R is hydrogen, a lower alkyl radical or a lower alkanoyl radical.

The compounds of this invention are produced from androstenolone, which is a weak androgen. These compounds have adrenocortical activity and are useful in the relief of inflammation of rheumatoid arthritis and similar collagen and allergic conditions, without undesirable androgenic, antiandrogenic and antiestrogenic effects.

The compounds of this invention can advantageously be employed in pharmaceutical formulations and applications because of their useful properties of the adrenocortical hormones. Thus they are anti-inflammatory agents and they resemble cortisone and cortisol in producing a decrease in vascular permeability and by increasing the resistance of the vascular wall to injury. They have particular utility in inducing thymolytic corticoid activity in mammals and can be applied parenterally and topically in aqueous suspensions or in innocuous organic solvents. They are thus useful in supplementing the cortical hormone production of mammals without the side effects of the androgenic hormones. These compounds are also useful as intermediates in the synthesis of adrenocorticoid compounds.

In the compounds of the foregoing formulae, R can represent hydrogen or lower alkyl radicals, such as methyl, ethyl, propyl, isopropyl or butyl radicals, or lower alkanoyl radicals such as formyl, acetyl, propionyl or butyryl radicals. The substituent X can represent the trifluoroacetyl radical and derivatives thereof such as trifluoroethylidene, trifluorohydroxyethyl, acetoxytrifluoroethylidene and similar aliphatic radicals containing three fluorine atoms.

It is an object of this invention to provide new androstenolone and androstanolone compounds which have useful physiological activity. It is a further object to provide efficient methods for producing such compounds from available steroids. Another object is to provide androstenolone and androstanolone compounds having fluorinated aliphatic radicals in the 16-position which are useful as adrenocorticoids. These and other objects are apparent from and are achieved in accordance with the following disclosure.

The compounds of this invention are produced from androstenolone. The first step is the condensation of androstenolone with an alkyl ester of trifluoracetic acid in the presence of an alkaline condensing agent such as an alkali metal hydride or an alkali metal alkoxide in an inert solvent. The condensation is preferably conducted in a nonoxidizing atmosphere at a temperature in the range of 50–150° C. By this procedure a trifluoroacetyl radical is introduced at the 16-position of androstenolone. The trifluoroacetylandrostenolone can then be reacted with an alkanoic acid anhydride, preferably in the presence of a basic solvent such as pyridine, quinoline or dimethylaniline, to form an enol alkanoate from the β-diketone which is formed by the introduction of the substituted acetyl radical at the 16-position of the androstenolone. The enol alkanoate can be hydrogenated in the presence of a noble metal catalyst whereby the double bond at the 16-position is reduced and the adjacent acyloxy radical is removed, thereby forming a trifluoroethyl substituent in the 16-position of the steroids shown in the general formulae above.

The invention is disclosed in further detail by means of the following examples which are provided to illustrate the invention without limiting it thereto. It will be apparent to those skilled in the art that various modifications in reaction conditions, reagents and equivalent materials can be made without departing from the invention herein disclosed. In the formulae of this application, solid bonds do not represent any particular stereoconfiguration unless specifically indicated by the letter β.

EXAMPLE 1

*16-Trifluoroacetyl-5-Androstene-3β-Ol-17-One*

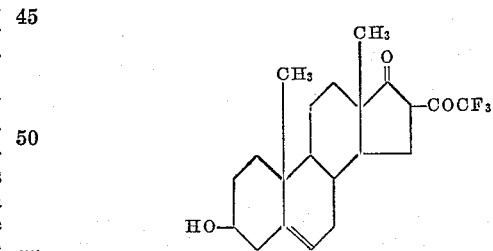

A mixture of 2.00 g. of 5-androstene-3β-ol-17-one, 50 ml. of dry benzene, 4 g. of sodium methoxide and 3 ml. of ethyl trifluoroacetate was refluxed gently for 2 hours with stirring. The solids went into solution and later the sodium salt of 16-trifluoroacetyl-5-androstene-3β-ol-17-one began to precipitate. The mixture was cooled in an ice bath and decomposed by the addition of 20 ml. of 5% hydrochloric acid. The resulting mixture was stirred at 0° C. for 20 minutes and then the benzene layer was separated, washed twice with water and with saturated NaCl solution, dried and evaporated. The solid residue of 16-trifluoroacetyl-5-androstene-3β-ol-17-one was recrystallized twice from heptane and afforded 1.26 g. of long needles of M.P. 152–153° C. The I.R. absorption spectrum had peaks at 5.90 and 6.1 microns and the optical rotation was $[\alpha]_D^{25}$ −36° in chloroform.

EXAMPLE 2

*16-(2,2,2-Trifluoro-1-Hydroxyethylidene)-5-Androstene-3β-Ol-17-One Diacetate*

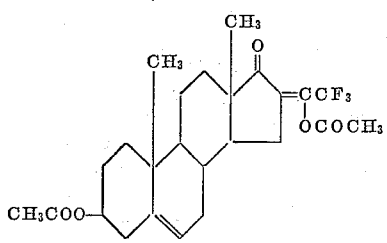

A solution of 1.26 g. of 16-trifluoroacetyl-5-androstene-3β-ol-17-one in 10 ml. of pyridine and 10 ml. of acetic anhydride was allowed to stand at 25° C. for 16 hours. On addition of ice, a solid product was obtained, M.P. 164–175° C. After two recrystallizations from methanol containing a trace (1 drop per 50 ml.) of pyridine there was obtained 720 mg. of 16-(2,2,2-trifluoro-1-hydroxyethylidene)-5-androstene-3β-ol-17-one diacetate of M.P. 198.5–200° C. Its I.R. absorption spectrum (in KBr) had peaks at 5.58, 5.75 and 6.00 microns and its U.V. absorption spectrum had $\lambda_{max.}^{EtOH}$ 234 millimicrons (E=7750)

Its optical rotation in chloroform was $[\alpha]_D^{25}$ —33°.

EXAMPLE 3

*16-(2,2,2-Trifluoroethyl)Androstane-3β-Ol-17-One Acetate*

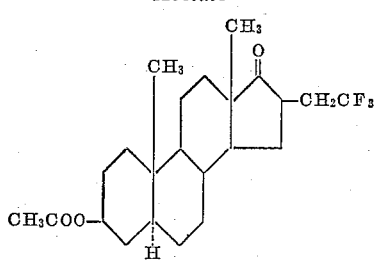

A mixture of 115 mg. of 16-(2,2,2-trifluoro-1-hydroxyethylidene)-5-androstene-3β-ol-17-one diacetate, 7.5 ml. of methanol and 100 mg. of palladium-charcoal catalyst was hydrogenated at atmospheric pressure and temperature for 2 hours during which 26.5 ml. of hydrogen was absorbed. The catalyst was removed and the methanol solution was evaporated, yielding 16-(2,2,2-trifluoroethyl)androstane-3β-ol-17-one acetate. After three recrystallizations from methanol 29 mg. of the product was obtained, M.P. 141–142.5° C. The product gave a negative tetranitromethane test. Its I.R. absorption spectrum (in KBr) had a peak at 5.73 microns.

EXAMPLE 4

*16-(2,2,2-Trifluoro-1-Hydroxyethyl)Androstane-3β-Ol-17-One*

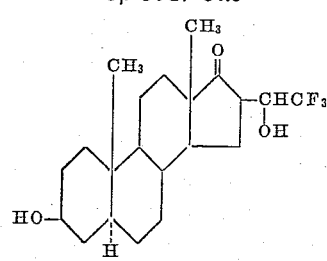

A solution of 15 g. of 16-trifluoroacetyl-5-androstene-3β-ol-17-one (Example 1) in 250 ml. of methanol was hydrogenated at 50 p.s.i.g. in the presence of 5 g. of 5% palladium-charcoal catalyst. The absorption of hydrogen ceased after 3¾ hours. The catalyst was removed and the solution evaporated. The residue of 16-(2,2,2-trifluoro-1-hydroxyethyl)androstane-3β-ol-17-one was recrystallized from ethyl acetate and afforded 11.31 g. of crystals of M.P. 225–236° C. Further recrystallization gave a M.P. of 236–239° C. The I.R. absorption spectrum (in KBr) had peaks at 2.90, 3.11 and 5.78 microns.

EXAMPLE 5

*16-(2,2,2-Trifluoro-1-Acetoxyethyl)Androstane-3β-Ol-17-One Acetate*

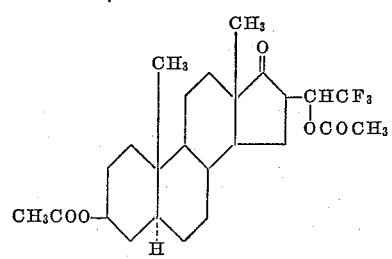

A solution of 1 gram of 16-(2,2,2-trifluoro-1-hydroxyethyl)androstane-3β-ol-17-one in 8 ml. of anhydrous pyridine and 8 ml. of acetic anhydride was maintained at 20–25° C. for 24 hours, then evaporated to dryness under reduced pressure. The residue of 16-(2,2,2-trifluoro-1-hydroxyethyl)androstane-3β-ol-17-one diacetate was recrystallized from methanol; M.P. 136–147° C. Its I.R. absorption spectrum (KBr) had peaks at 5.65 and 5.78 microns.

EXAMPLE 6

*16-(2,2,2-Trifluoro-1-Methoxyethyl)Androstane-3β-Ol-17-One*

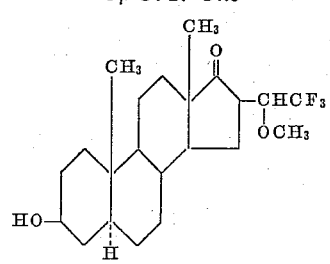

A solution of 0.5 gram of 16-(2,2,2-trifluoro-1-acetoxyethyl)androstane-3β-ol-17-one acetate in 30 ml. of 5% methanolic KOH solution was allowed to stand 1 hour at room temperature (20° C.). The solution was then diluted with water and extracted with ether. The ether extract was washed with water, dried and evaporated. The residue of 16-(2,2,2-trifluoro-1-methoxyethyl)androstane-3β-ol-17-one was crystallized from 30 ml. of heptane; yield 320 mg., M.P. 123–125° C. Further recrystallization raised the M.P. to 125–127° C. The I.R. absorption spectrum had maxima at 3.07 and 5.72 microns.

Treatment of 16 - (2,2,2 - trifluoro-1-methoxyethyl)-androstane-3β-ol-17-one with an excess of acetic anhydride in anhydrous pyridine gave 16-(2,2,2-trifluoro-1-methoxyethyl)-androstane-3β-ol-17-one acetate of M.P. 160–162° C. after recrystallization from hexane.

EXAMPLE 7

*16-(2,2,2-Trifluoro-1-Methoxy-Ethyl)Androstane-3β-Ol-17-One Acetate*

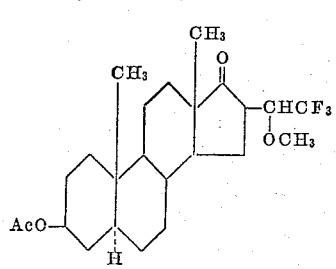

A solution of 2.2 grams of $KHCO_3$ in 22 ml. of water was added to a solution of 2.2 grams of 16-(2,2,2-trifluoro-1-acetoxyethyl)androstane-3β-ol-17-one acetate in 220 ml. of warm methanol. Stirring and heating effected solution of the reactants. The resulting solution was kept at 25° C. for 15 hours, then acidified with 3 ml. of acetic acid and evaporated under vacuum on a steam bath. Ice was added to the residue and the mixture was extracted with ether. The other extract was washed with 5% $KHCO_3$ solution, dried and evaporated. The residue of 16 - (2,2,2 - trifluoro - 1 - methoxyethyl) androstane - 3β-ol-17-one acetate was recrystallized from hexane; yield 308 mg., M.P. 149-160° C. Further recrystallization from hexane raised the M.P. to 160.5–162° C. The I.R. absorption spectrum of this compound had a peak at 5.74 microns.

What is claimed as new and is desired to be secured by Letters Patent of the United States is:

1. Compound selected from steroids of the group consisting of those of the formulae

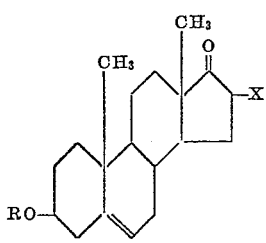

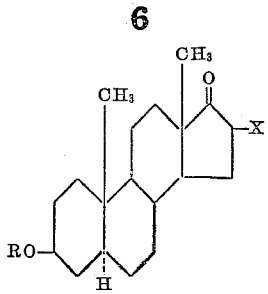

wherein R is selected from the group consisting of hydrogen, lower alkyl and lower alkanoyl radicals and X is selected from the group consisting of trifluoroacetyl, trifluoroacetoxyethylidene, trifluoroethyl, trifluorohydroxyethyl, trifluoroacetoxyethyl, and trifluoromethoxyethyl radicals.

2. Compound as defined by claim 1 wherein R is H and X is trifluoroacetyl.
3. Compound as defined by claim 1 wherein R is acetoxyl and X is trifluoroacetoxyethylidene.
4. Compound as defined by claim 1 wherein R is acetoxyl and X is trifluoroethyl.
5. Compound as defined by claim 1 wherein R is H and X is trifluorohydroxyethyl.
6. Compound as defined by claim 1 wherein R is H and X is trifluoromethoxyethyl.
7. Compound as defined by claim 1 wherein R is acetoxyl and X is trifluoromethoxyethyl.

References Cited in the file of this patent
Frieser et al.: Sterioids (1959), pp. 519 and 695.